US008200282B2

(12) United States Patent
Liang et al.

(10) Patent No.: US 8,200,282 B2
(45) Date of Patent: Jun. 12, 2012

(54) PORTABLE ELECTRONIC DEVICE WITH CHIP CARD EJECTING MECHANISM

(75) Inventors: Hua-Xiang Liang, Shenzhen (CN); Hsiao-Hua Tu, Taipei (TW); Jun Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 441 days.

(21) Appl. No.: 12/555,056

(22) Filed: Sep. 8, 2009

(65) Prior Publication Data

US 2010/0079933 A1 Apr. 1, 2010

(30) Foreign Application Priority Data

Sep. 26, 2008 (CN) .......................... 2008 1 0304701

(51) Int. Cl.
*G06F 1/16* (2006.01)
(52) U.S. Cl. ................. 455/558; 361/679.3; 361/679.56; 379/433.09
(58) Field of Classification Search ............... 361/679.3, 361/679.56; 455/558
See application file for complete search history.

(56) References Cited

U.S. PATENT DOCUMENTS

| 4,774,399 | A | * | 9/1988 | Fujita et al. ................... 235/441 |
| 5,790,659 | A | * | 8/1998 | Strand ...................... 379/433.09 |
| 6,018,669 | A | * | 1/2000 | Stoegmueller ................ 455/558 |
| 6,757,172 | B2 | * | 6/2004 | Maruyama ................... 361/737 |
| 6,875,041 | B1 | * | 4/2005 | Chang et al. .................. 439/347 |
| 6,954,653 | B2 | * | 10/2005 | Morita ...................... 455/550.1 |
| 7,131,871 | B1 | * | 11/2006 | Zuo et al. ..................... 439/630 |
| 7,280,846 | B2 | * | 10/2007 | Lin .............................. 455/558 |
| 7,925,301 | B2 | * | 4/2011 | Kubo ............................ 455/558 |
| 2002/0036896 | A1 | * | 3/2002 | Matsumoto ................... 361/752 |
| 2003/0069040 | A1 | * | 4/2003 | Chuang et al. ............... 455/558 |

* cited by examiner

*Primary Examiner* — Anthony Q Edwards
(74) *Attorney, Agent, or Firm* — Altis Law Group, Inc.

(57) ABSTRACT

A portable electronic device comprises a housing and a chip card ejecting mechanism. The housing has a mounting portion defined therein. The ejecting mechanism includes a holder and a controlling module. The holder is slidably accommodated in the mounting portion of the housing. The controlling module includes a button and an ejecting element. The button releasably secures with the holder in the mounting portion. The ejecting element resistes against the holder to provide an elastic force for driving the holder slid. When the button is pressed, the holder is released and the ejecting element ejects the holder outwardly from the mounted portion of the housing.

19 Claims, 7 Drawing Sheets

PORTABLE ELECTRONIC DEVICE WITH CHIP CARD EJECTING MECHANISM

BACKGROUND

1. Technical Field

The present disclosure relates to portable electronic devices, and particularly to portable electronic devices with chip card ejecting mechanisms.

2. Description of Related Art

Commonly, portable electronic devices such as mobile phones include a chip card holder for holding the chip card therein.

Typically, chip card holders define a receiving groove for receiving the chip card. The chip card is partly received in the receiving groove to electronically connect to a circuit of the device employing the chip card, and partly exposed so that it may be gripped for removal. However, the exposed part of the chip card is usually small and therefore difficult for a user to grasp in removing the chip card from the holder.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary chip card ejecting mechanism and portable electronic device using the chip card ejecting mechanisms. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
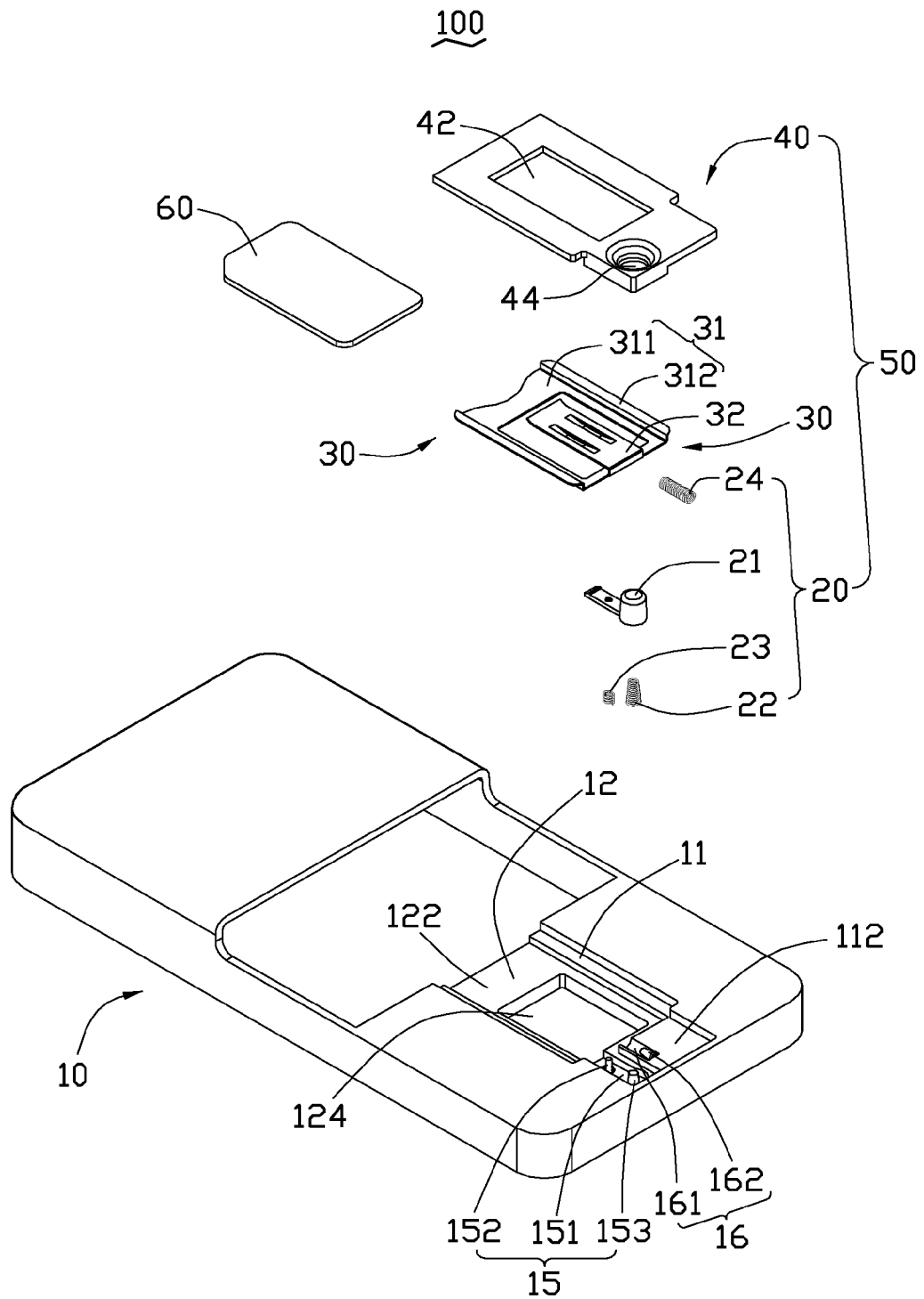
FIG. 1 is an exploded view of one embodiment of a chip card ejecting mechanism used in a portable electronic device, the portion of the portable electronic device including a housing, a chip card and a chip card ejecting mechanism.

Referring to FIG. 1, an embodiment of a chip card ejecting mechanism 50 can be used on a portable electronic device 100, such as a cellular phone or any electronic device where a chip card is desirable. The portable electronic device 100 includes a housing 10 and a chip card ejecting mechanism 50 mounted to the housing 10. The chip card ejecting mechanism 50 is configured to mount the chip card 60 to the housing 10.

Figure 2:
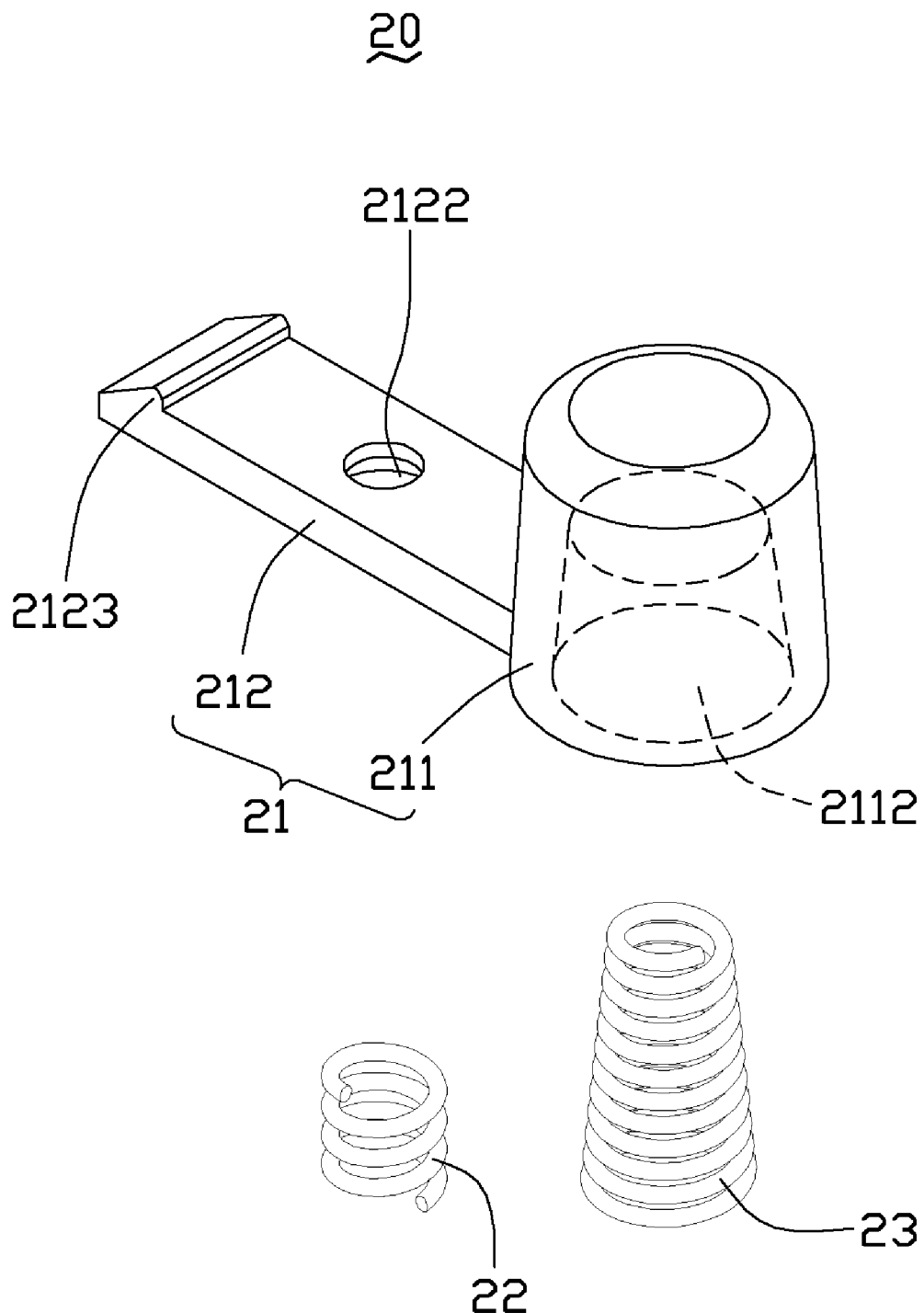
FIG. 2 is a partially enlarged view of a controlling module shown in FIG. 1.

The chip card ejecting mechanism 50 includes a controlling module 20, a holder 30 and a cover 40. The controlling module 20 includes a button 21, two restoring elements, such as two elastic members 22, 23 and an ejecting element, such as an elastic member 24. In this exemplary embodiment, the elastic members 22, 24 are both cylindrical springs, the elastic member 23 is a tapered spring. Referring to FIG. 2, the button 21 has an operating portion 211 and a latching portion 212. The operating portion 211 may be a hollow cylinder that defines a tapered chamber 2112 therein. The chamber 2112 is configured to accommodate a restoring element. The latching portion 212 protrudes from an outer peripheral surface of the operating portion 211. The latching portion 212 has a first hole 2122 defined at a center portion thereof corresponding to another restoring element, and a hook 2123 formed a distal end thereof. The hook 2123 is configured to latch with the holder 30.

Figure 3:
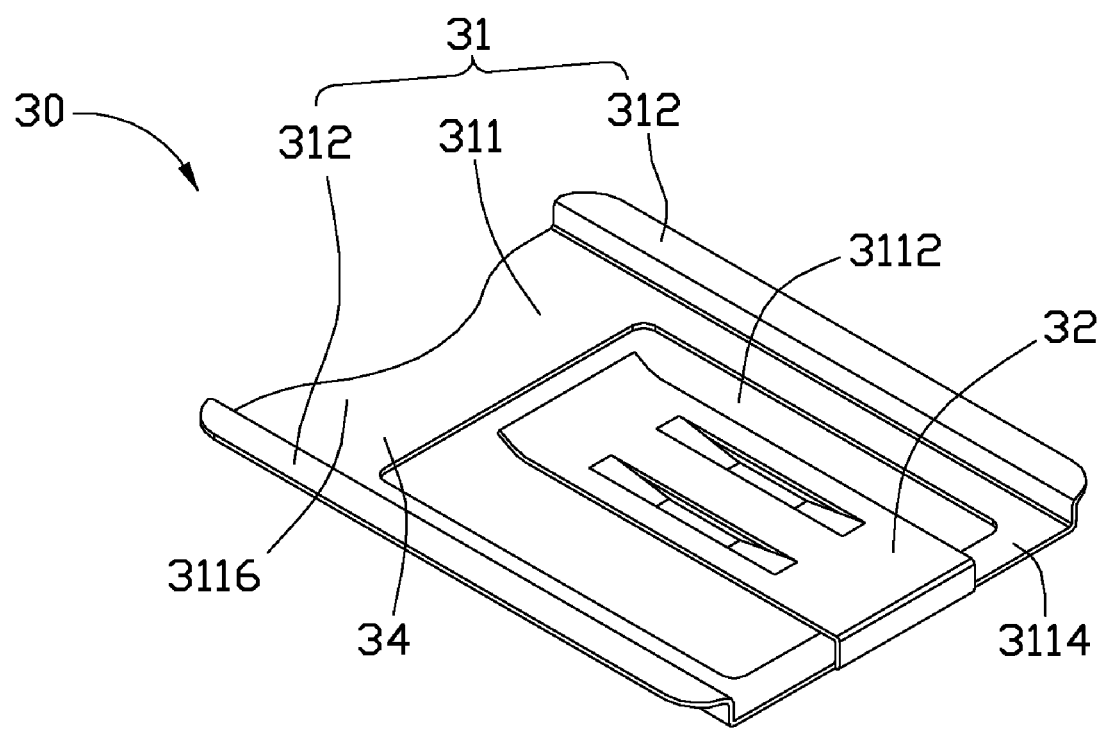
FIG. 3 is a partially enlarged view of a holder shown in FIG. 1.

Referring to FIG. 3, the holder 30 includes a main body 31 and a securing section 32 extending from the main body 31. The main body 31 includes a base 311, two L-shaped holding sections 312 upwardly protruding from two opposite edges of the base 311. The base 311 and the holding sections 312 cooperatively define a receiving space 34 configured for supporting and securing the chip card 60. The base 311 includes two opposite end portions 3114, 3116, and has a first opening 3112 defined between the end portions 3114, 3116. The role of the first opening 3112 will be describedbelow.

Figure 4:
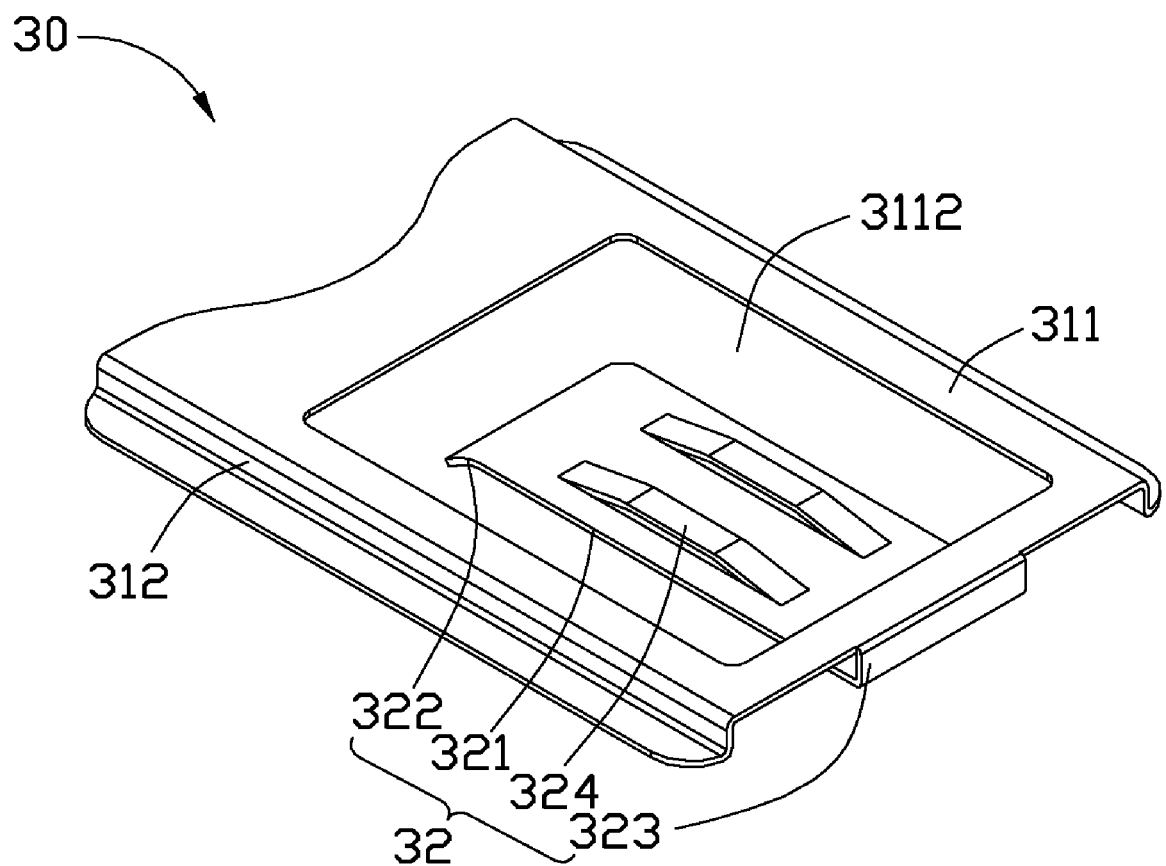
FIG. 4 is similar to FIG. 3, but showing the holder in another aspect.

Referring to FIG. 4, the securing section 32 is a substantially L-shaped resilient plate and includes a connecting portion 323 perpendicularly extending from the end portion 3114 of the base 311, and a securing portion 321 extending from a distal end of the connecting portion 323 toward the end portion 3116 of the base 311. The securing section 32 has at least one resisting portion 324, such as two elastic plates protruding from the securing portion 321 toward the base 311. The resisting portions 324 are configured to resist the chip card 60 to securely accommodate the chip card 60 in the receiving space 34. The securing section 32 further includes a braking portion 322 extending from a distal end of the securing portion 321 away from the base 311, and the role of the braking portion 322 will be described below.

Figure 6:
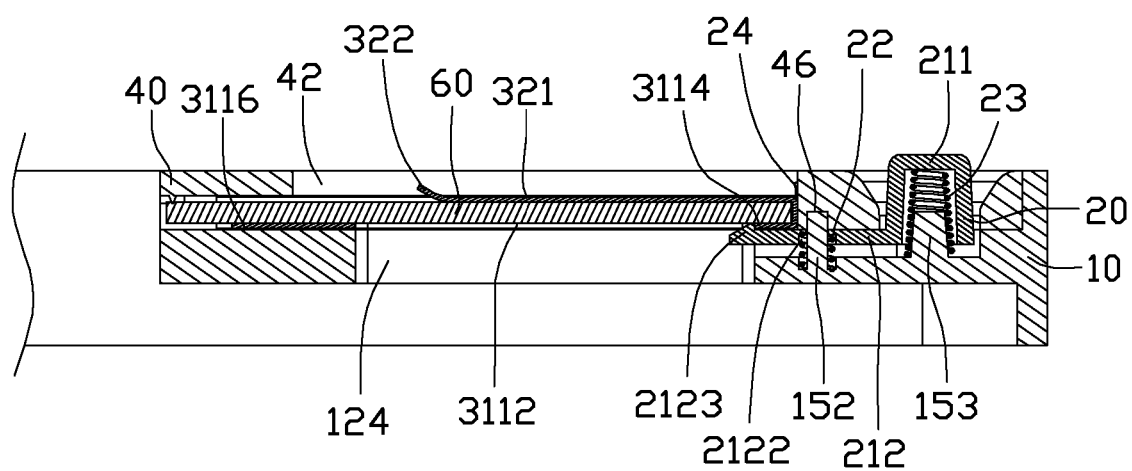
FIG. 6 is a partially enlarged and cross-sectional view of the portion of the portable electronic device shown in FIG. 5 along a line of VI.

Referring to FIGS. 1 and 6, the cover 40 has a second opening 42, a trough 44 and a second hole 46 (FIG. 6). The second opening 42 is defined through a center portion of the cover 40 corresponding to the securing portion 321 of the holder 30. The length of the second opening 42 is larger than that of the securing portion 321, so that the securing portion 321 can slide in the second opening 42. The trough 44 is defined through an end portion of the cover 40 corresponding to the operating portion 211 of the button 21. The trough 44 is sized to expose the operating portion 211 out of the cover 40. The second hole 46 is defined in the portion of the cover 40 between the second opening 42 and the trough 44. The second hole 46 corresponds to the first hole 2122.

Referring to FIGS. 1 and 6, the housing 10 has a mounting portion configured to mount the chip card ejecting mechanism 50 on the housing 10 in the form of a first slot 11 and a second slot 12 defined therein. The first slot 11 is configured to accommodate the cover 40 therein and has the same shape and size as the cover 40, and has a first bottom wall 112 formed in the first slot 11. The second slot 12 is defined in the first bottom wall 112 through one end of the first bottom wall 112. The second slot 12 substantially has the same shape as the holder 30 with a slightly larger size than the holder 30, such that the holder 30 can slidably accommodate in the second slot 12. The housing 10 has a second bottom wall 122 formed in the second slot 12 and has a third opening 124 defined through the second bottom wall 122. The third opening 124 is aligned with the first opening 3112 when the holder 30 is accommodated in the second slot 12, so that a chip (not shown) of the chip card 60 can be exposed to connect to a chip card connector (not shown) in the portable electronic device 100.

The housing 10 further has a first retaining portion 15 and a second retaining portion 16. The first retaining portion 15 includes a recess 151, a first retaining pole 152 and a second retaining pole 153. The recess 151 is defined adjacent to another end of the first bottom wall 112 communicating with the second slot 12. The first retaining pole 152 and the second retaining pole 153, both of which are upwardly protruded from a bottom surface in the recess 151. The first retaining pole 152 and the second retaining pole 153 are sized and configured to retain the restoring elements 22, 23, respectively. The second retaining portion 16 includes a groove 161 and a fixing pole 162. The groove 161 is defined adjacent to the recess 151. The groove 161 communicates with the second slot 12 and is configured to accommodate the ejecting element 24. The fixing pole 162 protrudes from an inner surface of the groove 161 facing the second slot 12. The fixing pole 162 is configured to mount the ejecting portion 24 to the housing 10.

Figure 5:
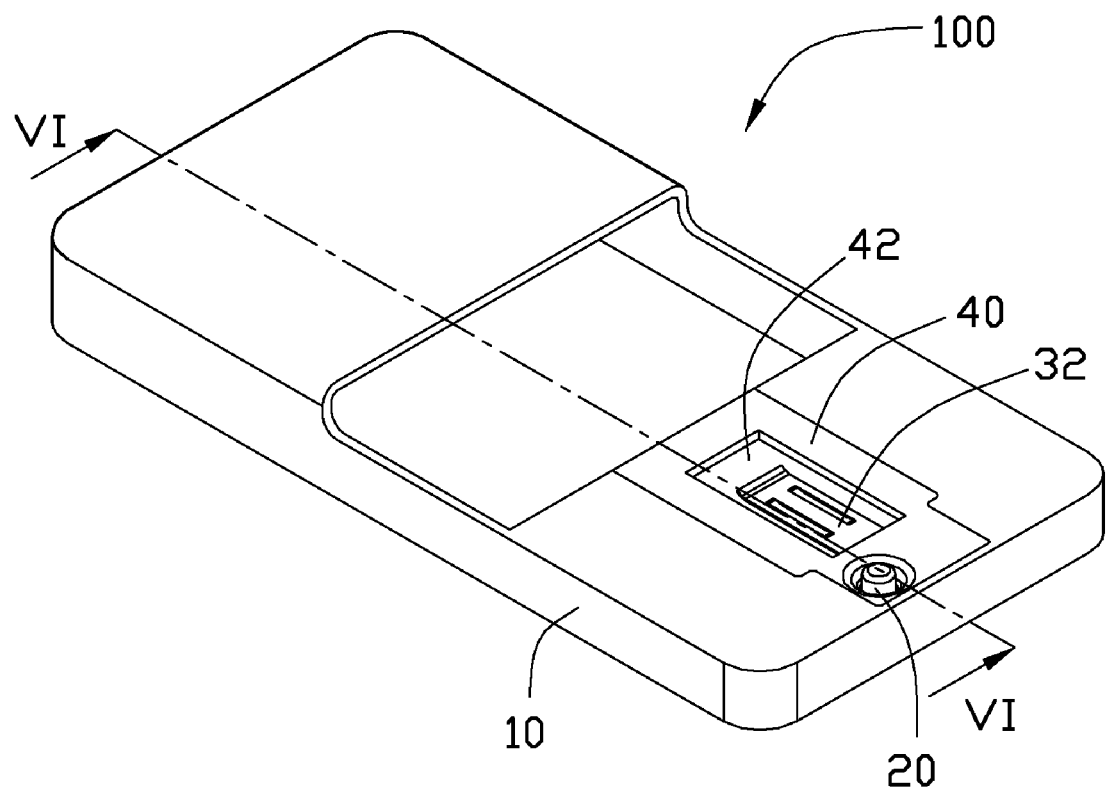
FIG. 5 is an assembled view of the portion of the portable electronic device.
Figure 7:
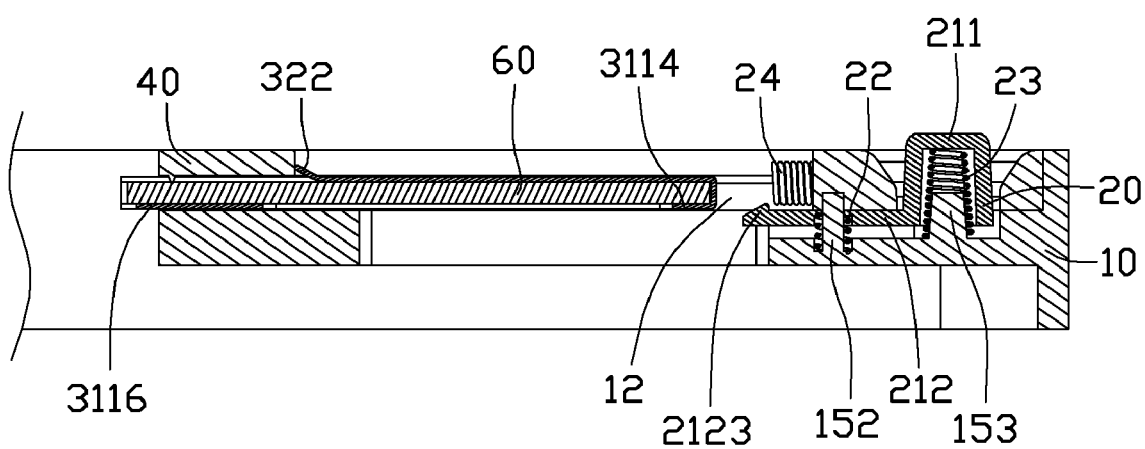
FIG. 7 is similar to FIG. 6, but the chip card ejecting mechanism is released.

Referring to FIGS. 5 to 7, during assembling the portable electronic device 100, firstly, the restoring elements 22, 23 are respectively retained on the first retaining pole 152 and the second retaining pole 153. Secondly, the first hole 2122 of the button 21 and the chamber 2112 of the button 21 are respectively aligned with the first retaining pole 152 and the second retaining pole 153. Then, the button 21 is pressed toward the housing 10, until the first retaining pole 152 passes through the first hole 2122 and the second retaining pole 153 is accommodated in the chamber 2112. The ejecting element 24 is wound on the fixing pole 162 in the groove 161. The holder 30 is accommodated in the second slot 12. At this time, the ejecting element 24 is compressed and has a trend of rebounding, so as to provide an elastic force for driving the holder 30 to slide in the second slot 12. Simultaneously, the hook 2123 is positioned in the first opening 3112 and latch with the end portion 3114 of the base 311, to stop the holder 30 sliding in the second slot 12. Thus, the end portion 3114 of the base 311 acting as a locking portion of the holder 30 latches with the hook 2123 to lock the holder 30 in the second slot 12.

After that, the cover 40 is mounted to the housing 10 to yield an assembled portable electronic device 100. At this time, the second opening 42 of the cover 40 is aligned with the securing section 32 of the holder 30. The braking portion 322 enters into the second opening 42, the operating portion 211 of the button 21 passes through the trough 44 to expose outwardly. A distal end of the first retaining pole 152 passes into the second hole 46 of the cover 40, and the restoring element 22 resists the cover 40 around the second hole 46. Additionally, the cover 40 slightly resists the holder 30 and the latching portion 212 of the button 21, to firmly hold the holder 30 and the button 21 between the housing 10 and the cover 40.

When assembling the chip card 60 to the housing 10, firstly, the button 21 is pressed toward the housing 10 until the hook 2123 of the button 21 is released from the end portion 3114 of the holder 30. Once the button 21 is released, the holder 30 is ejected under the elastic force of the ejecting element 24, such that the holder 30 slid outwardly from the second slot 12 until the braking portion 322 resists against an inner surface of the cover 40 (seen FIG. 7), to expose the receiving space 34 of the holder 30. Then, the chip card 60 is laid in the receiving space 34. At this time, the resisting portions 324 resist against the chip card 60 to firmly secure the chip card 60 in the receiving space 34. After that, the holder 30 is pushed into the second slot 12 again. At this time, the end portion 3114 of the holder 30 is latched with the hook 2123 of the button 21 again to lock the holder 30 in the second slot 12, the ejecting element 24 is compressed to accumulate elastic force.

When detaching the chip card 60 out of the holder 30, the button 21 is pressed to release the holder 30 from the hook 2123 of the button 21. Then, the holder 30 is ejected by the elastic force of the ejecting element 24 to expose the receiving space 34 again, so the chip card 60 can be easily detached from the receiving space 34.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device comprising:
a housing, the housing having a mounting portion defined therein; and
a chip card ejecting mechanism, the chip card ejecting mechanism including a holder and a controlling module, the holder slidably accommodated in the mounting portion of the housing, the controlling module including a button and an ejecting element, the button releasably latching with the holder, the ejecting element resisting against the holder to provide an elastic force for sliding the holder;
wherein when the button is pressed, the holder is released and the ejecting element ejects the holder outwardly from the mounted portion of the housing.

2. The portable electronic device of claim 1, wherein the holder includes a locking portion, the button includes a hook releasably latching with the locking portion.

3. The portable electronic device of claim 2, wherein the holder includes main body, the main body includes a base and two holding section protruding from two opposite edges of the base, the base and the holding sections corporately define a receiving space configured for supporting and securing a chip card therein.

4. The portable electronic device of claim 3, wherein the base has two opposite end portions and has a first opening defined between the two end portions thereof, the first opening is configured to expose a chip of the chip card to connect to a chip card connector, the locking portion is one end portion of the holder.

5. The portable electronic device of claim 4, wherein the holder further includes a securing section extending from the locking portion, the securing section is configured to firmly accommodate the chip card in the receiving space.

6. The portable electronic device of claim 5, wherein the securing section includes a connecting portion protruding from the locking portion, a securing portion extending from a distal end of the connecting portion above the base, the securing section further has a plurality of resisting portions protruding from the securing portion toward the base, the resisting portions resist against the chip card when the chip card is accommodated in the receiving space.

7. The portable electronic device of claim 6, wherein the holder further has a braking portion formed in a distal end of the securing portion, the chip card ejecting mechanism further include a cover covering the holder, the cover include a second opening defined therein, the braking portion is slidably accommodated in the second opening such that when the braking portion resists against an inner surface of the second opening, the holder stops sliding.

8. The portable electronic device of claim 7, wherein the mounting portion includes a first slot defined in the housing, so a bottom wall defined in the first slot, the first slot is configured to accommodate the cover therein.

9. The portable electronic device of claim 8, wherein the mounting portion further include a second slot defined in the bottom wall of the first slot, the second slot substantially has the same shape as main body of the holder with a slightly larger size than the main body, the main body is accommodated in the second slot.

10. The portable electronic device of claim 7, wherein the cover further includes a trough defined therethough corresponding to the button, the button includes an operating portion that passes through the trough.

11. The portable electronic device of claim 10, wherein the controlling module further includes a restoring element mounted between the operating portion and the housing, the restoring element is configured to provide an elastic force for restoring the operating portion to its original state.

12. The portable electronic device of claim 10, wherein the restoring element is an elastic member.

13. The portable electronic device of claim 11, wherein the operating portion has a chamber defined therein for accommodating the restoring element, the housing has a retaining pole protruding therefrom, the restoring element is wound on the retaining pole.

14. The portable electronic device of claim 11, wherein the button further includes a latching portion protruding from an outer surface of the operating portion, the hook is protruding from a distal end of the latching portion.

15. The portable electronic device of claim 14, wherein the controlling module further includes an another restoring element mounted between the latching portion and the housing, said another restoring element is configured to provide an elastic force for restoring the latching portion to its original state.

16. The portable electronic device of claim 1, wherein the ejecting element is an elastic member.

17. A portable electronic device comprising:
   a housing, the housing having a mounting portion defined therein; and
   a chip card ejecting mechanism, the chip card ejecting mechanism including a holder for accommodating a chip card therein and a controlling module mounted to the housing, the holder slidably accommodated in the mounting portion of the housing, the controlling module including a button and an ejecting element, the button releasably latching with the holder, the ejecting element providing an elastic force for driving the holder slid;
   wherein when the button is triggered, the holder is released from the button and the ejecting element biases the holder to expose the chip card.

18. The portable electronic device of claim 17, wherein the holder includes a locking portion, the button includes a hook releasably latching with the locking portion.

19. The portable electronic device of claim 18, wherein the ejecting element is a elastic member.

\* \* \* \* \*